(12) United States Patent
Mantin

(10) Patent No.: US 9,374,410 B2
(45) Date of Patent: Jun. 21, 2016

(54) SYSTEM AND METHOD FOR SEAMLESS SWITCHOVER BETWEEN UNICAST AND MULTICAST SOURCES OF OVER-THE-TOP STREAMS

(71) Applicant: imVision Software Technologies Ltd., Ramat Gan (IL)

(72) Inventor: Sharon Mantin, Tel Aviv (IL)

(73) Assignee: Imvision Software Technologies Ltd., Ramat Gan (IL)

( * ) Notice: Subject to any disclaimer, the term of this patent is extended or adjusted under 35 U.S.C. 154(b) by 15 days.

(21) Appl. No.: 14/339,035

(22) Filed: Jul. 23, 2014

(65) Prior Publication Data

US 2015/0030022 A1 Jan. 29, 2015

Related U.S. Application Data

(60) Provisional application No. 61/857,723, filed on Jul. 24, 2013.

(51) Int. Cl.
*H04L 29/06* (2006.01)
*H04L 12/18* (2006.01)
*H04N 21/266* (2011.01)

(52) U.S. Cl.
CPC .............. *H04L 65/80* (2013.01); *H04L 12/18* (2013.01); *H04L 65/4076* (2013.01); *H04L 65/4084* (2013.01); *H04N 21/26616* (2013.01)

(58) Field of Classification Search
None
See application file for complete search history.

(56) References Cited

U.S. PATENT DOCUMENTS

| | | | |
|---|---|---|---|
| 6,937,081 B2 * | 8/2005 | Ishikawa | H03K 5/133 327/261 |
| 2005/0190781 A1 * | 9/2005 | Green | H04L 29/06027 370/432 |
| 2006/0020995 A1 * | 1/2006 | Opie | H04N 21/23424 725/117 |
| 2006/0245444 A1 * | 11/2006 | Sharpe | H04N 21/23805 370/412 |
| 2010/0254462 A1 * | 10/2010 | Friedrich | H04N 21/26616 375/240.25 |
| 2012/0144445 A1 * | 6/2012 | Bonta | H04L 12/1868 725/116 |
| 2014/0282777 A1 * | 9/2014 | Gonder | H04L 65/605 725/109 |

\* cited by examiner

*Primary Examiner* — Christopher Crutchfield
(74) *Attorney, Agent, or Firm* — M&B IP Analysts, LLC

(57) ABSTRACT

A method and system for switching between a unicast streaming source and a multicast streaming source of over-the-top (OTT) streams are provided. The method includes retrieving an OTT unicast stream from the unicast streaming source and an OTT multicast stream from the multicast streaming source, wherein there is a time delay between the OTT unicast stream and the OTT multicast stream; synchronizing the OTT unicast stream and the OTT multicast stream to compensate for the time delay; selecting one of the OTT unicast stream and the OTT multicast stream; and switching to a streaming source of the selected OTT stream.

15 Claims, 6 Drawing Sheets

SYSTEM AND METHOD FOR SEAMLESS SWITCHOVER BETWEEN UNICAST AND MULTICAST SOURCES OF OVER-THE-TOP STREAMS

CROSS-REFERENCE TO RELATED APPLICATIONS

This application claims the benefit of U.S. Provisional Application No. 61/857,723 filed on Jul. 24, 2013, the contents of which are hereby incorporated by reference.

TECHNICAL FIELD

The present invention relates generally to video and audio delivery of live and linear over-the-top content and, more particularly, to seamless switchover between a unicast streaming source and a multicast streaming source in communication networks.

BACKGROUND

The world of digital delivery of multimedia content to viewers has been rapidly progressing. Typical types of multimedia content include video clips, electronic games, and interactive content. The delivery process for such multimedia content, particularly those transmitted in a form of video, may entail use of a variety of delivery standards, video quality levels, and other parameters. The techniques used in traditional television (TV) broadcast cannot be effectively used in the more modern multi-standard digital TV arena. Currently, only piecemeal solutions are available for efficient and seamless delivery of such multimedia content to the arena of digital TV.

Specifically, content delivery is currently performed using two approaches: legacy content distribution and over-the-top (OTT) content distribution. Legacy content providers include, for example, cable, satellite, and internet protocol TV (IPTV) providers. Typically, such providers have full control over the entire delivery chain, from head-end through the network to the end user's device (e.g., a set-top box). Therefore, legacy content providers can manage and guarantee efficient content delivery mechanisms and high Quality of Experience (QoE) to the end user.

Over-the-top (OTT) content distribution is the delivery of audio, video, and other types of multimedia content over the Internet without any control of the content distribution by the network operators and/or by the content providers. The providers of OTT content are third party providers which utilize the network's infrastructure to provide content to their subscribers. As such, OTT content providers are not responsible for controlling redistribution of the content. Examples for OTT content providers are Hulu®, Netflix®, and the like.

In most cases, OTT content providers control only the edges of a content distribution network. These edges are streaming servers at the head-end and the media players installed in user devices. However, as noted above, OTT content providers have no control over the distribution network. Rather, such providers merely utilize the network's infrastructure to deliver content. As such, OTT content providers are not responsible for the overall efficiency of OTT content distribution over the network and, as such, cannot guarantee high QoE to their subscribers.

The popularity of OTT services downgrades the performance of the communication networks managed by Internet service provider (ISPs). Specifically, OTT content delivery significantly increases the bandwidth consumption in such networks. As a result, ISPs cannot ensure high Quality of Services (QoS) to their subscribers, thereby forcing ISPs to upgrade their networks to support the increased demand for bandwidth. In addition, congested networks cause higher packets loss and longer packet delays, thereby downgrading the QoE of OTT streaming services.

Unicast streaming occurs where the content being streamed is transferred directly from one point to another within a communication network. In contrast, multicast streaming occurs where the content being streamed is sent out to various points in a communication network, whereby interested users may access the streamed content. Multicast streaming may be desirable when, e.g., multiple users desire access to the same content. One multicast stream sent to multiple points will usually yield lower bandwidth usage than an equivalent number of unicast streams. Unicast streams, on the other hand, may require lower bandwidth if content is streamed to a single point than a multicast stream to that point would require.

Transitioning between unicast and multicast streams allows content providers to attempt to minimize bandwidth usage in communication networks. Transitioning between unicast streaming signals and multicast streaming signals requires utilization of communication bandwidth. Further, such switching typically negatively affects the quality of playback of OTT content, thereby decreasing a user's QoE with respect to the content. It would therefore be desirable to provide a switching solution that would be seamless, i.e., that would not substantially interfere with the user's QoE of switched content during switching.

It would therefore be advantageous to provide a solution that would overcome the deficiencies of the prior art by allowing seamless switchover between unicast and multicast streaming sources.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all aspects nor delineate the scope of any or all embodiments. Its sole purpose is to present some concepts of one or more embodiments in a simplified form as a prelude to the more detailed description that is presented later. For convenience, the term some aspects may be used herein to refer to a single aspect or multiple aspects of the disclosure.

The disclosure relates in various embodiments to a method for switching between a unicast streaming source and a multicast streaming source of over-the-top (OTT) streams. The method comprises retrieving an OTT unicast stream from the unicast streaming source and an OTT multicast stream from the multicast streaming source, wherein there is a time delay between the OTT unicast stream and the OTT multicast stream; synchronizing the OTT unicast stream and the OTT multicast stream to compensate for the time delay; selecting one of the OTT unicast stream and the OTT multicast stream; and switching to a streaming source of the selected OTT stream.

The disclosure also relates in various embodiments to a communication terminal. The communication terminal comprises a processing unit; and a memory, the memory containing instructions that, when executed by the processing unit, configure the terminal to: retrieve an OTT unicast stream from the unicast streaming source and an OTT multicast stream from the multicast streaming source, wherein there is a time delay between the OTT unicast stream and the OTT multicast stream; synchronize the OTT unicast stream and the OTT multicast stream to compensate for the time delay; select one of the OTT unicast stream and the OTT multicast stream; and switch to a streaming source of the selected OTT stream.

The disclosure also relates in various embodiments to a communication terminal. The communication terminal comprises a user interface; a processing unit; and a memory, the memory containing instructions that, when executed by the processing unit, configure the terminal to: retrieve an OTT unicast stream from the unicast streaming source and an OTT multicast stream from the multicast streaming source, wherein there is a time delay between the OTT unicast stream and the OTT multicast stream; synchronize the OTT unicast stream and the OTT multicast stream to compensate for the time delay; select one of the OTT unicast stream and the OTT multicast stream; and switch to a streaming source of the selected OTT stream.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
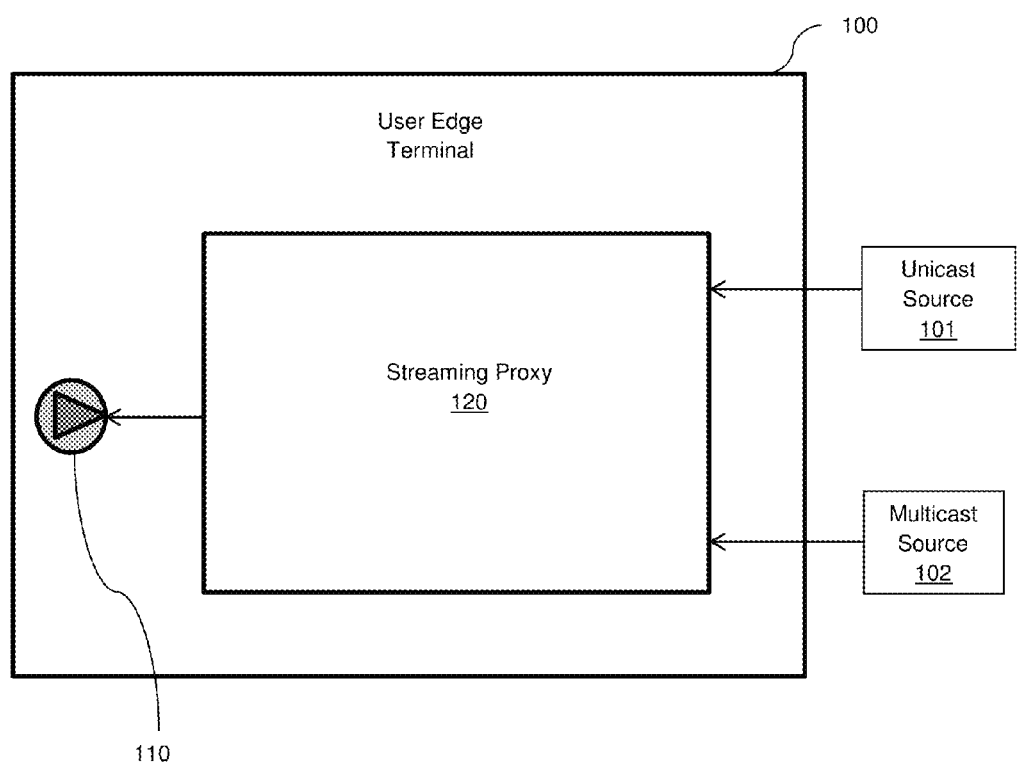
FIG. 1 is a schematic block diagram of a user edge terminal for seamless switchover between unicast and multicast streaming sources according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 shows an exemplary and non-limiting schematic block diagram of a user edge terminal 100 configured according to an embodiment. A media player 110 is operable in the user edge terminal 100 and configured to play over-the-top (OTT) content streams from an OTT content server. The media player 110 may be a standalone application or executed from a web-browser, an application (e.g., a mobile app), and the like.

The OTT stream may be, but is not limited to, a live OTT stream, a linear OTT stream, a replicated OTT stream, or any other type of OTT stream that can be multicasted (such streams commonly referred to individually hereinafter as a "live OTT stream"). The content of a live OTT stream may include video/audio content. The media player 110 is also configured to playback the retrieved stream on the user edge terminal 100. The user edge terminal 100 may be, but is not limited to, a personal computer (PC), a smart phone, an electronic kiosk, a tablet computer, a wearable computing device, and the like.

A streaming proxy 120 is installed or otherwise implemented on the user edge terminal 100 to manage and control unicast and multicast OTT streams provided to the terminal 100. During typical operation, the streaming proxy 120 is configured to receive live OTT streams from a unicast streaming source 101 and a multicast streaming source 102. It should be noted that the OTT streams are received from the sources 101 and 102 at the same time only when switching from one source to another. Thereafter, i.e., when the switchover is completed, the OTT stream is delivered to the media player 110 from a single (selected) source.

In some embodiments, the unicast streaming source 101 is an OTT content server managed by the OTT content provider or by a content distribution network (CDN). OTT content servers are typically deployed in datacenters in different geographical locations and may be connected to CDNs to accelerate content delivery to end user terminals. OTT content servers deliver content to end user terminals using unicast transmission. That is, for different destinations (user terminals), different streams are generated and delivered. The multicast streaming source 102 is a system that reproduces a multicast OTT stream from a plurality of unicast OTT streams in order to reduce the bandwidth consumption in communication networks resulting from the delivery of OTT content in such networks. Typically, both unicast streaming source 101 and multicast streaming source 102 are connected to the proxy 120 through a network (not shown), which may be, but is not limited to, a local area network, a wide area network (WAN), a metropolitan area network (MAN), the Internet, and the like.

In an embodiment, the streaming proxy 120 may be implemented in an external system communicatively connected to the user edge terminal 100. In one implementation, a streaming proxy 120 is realized as a virtual machine executed in such an external system. Accordingly, an instance of a streaming proxy 120 is created for each user terminal.

According to one embodiment, the streaming proxy 120 is configured to select one of the streaming sources 101 or 102, as well to switch to the selected source (e.g., source 101 or 102). The switching from one source to the other is performed without stopping, delaying, or impacting the reception of a stream played by the media player 110. That is, from the viewer's perspective, the transition to a different OTT streaming source is seamless and would not impact the QoE provided to a viewer of the media player 110.

In some embodiments, the streaming proxy 120 is further configured to switchover from a selected source to another source such as, e.g., from the unicast streaming source 101 to the multicast streaming source 102, or vice-versa. The switchover decision may be taken based on various parameters. In one embodiment, the switchover may be required if, for example, the number of users attempting to access the OTT content increases such that switching from several unicast streams to one multicast stream would decrease bandwidth and improve user experience. In such cases, the streaming proxy 120 is configured to temporarily retrieve both the multicast and unicast streams, thereby enabling the stream to continue uninterrupted as the user edge terminal 100 transitions from providing a unicast stream to providing a multicast stream.

In another embodiment, the streaming proxy 120 is configured to reformat the received OTT stream from the multicast source 102 to a streaming format (i.e., a streaming protocol) expected by the media player 110 prior to routing the OTT stream from the multicast source 102 to the media player 110. That is, in order to maintain transparency for the media player 110, an OTT stream received in a multicast format (e.g., RTSP over User Datagram Protocol (UDP) or hypertext markup language (HTML) object over UDP) may be reformatted into a unicast format supported by the media player 110 (e.g., a RTMP over TCP or HLS over TCP, respectively).

Figure 2:
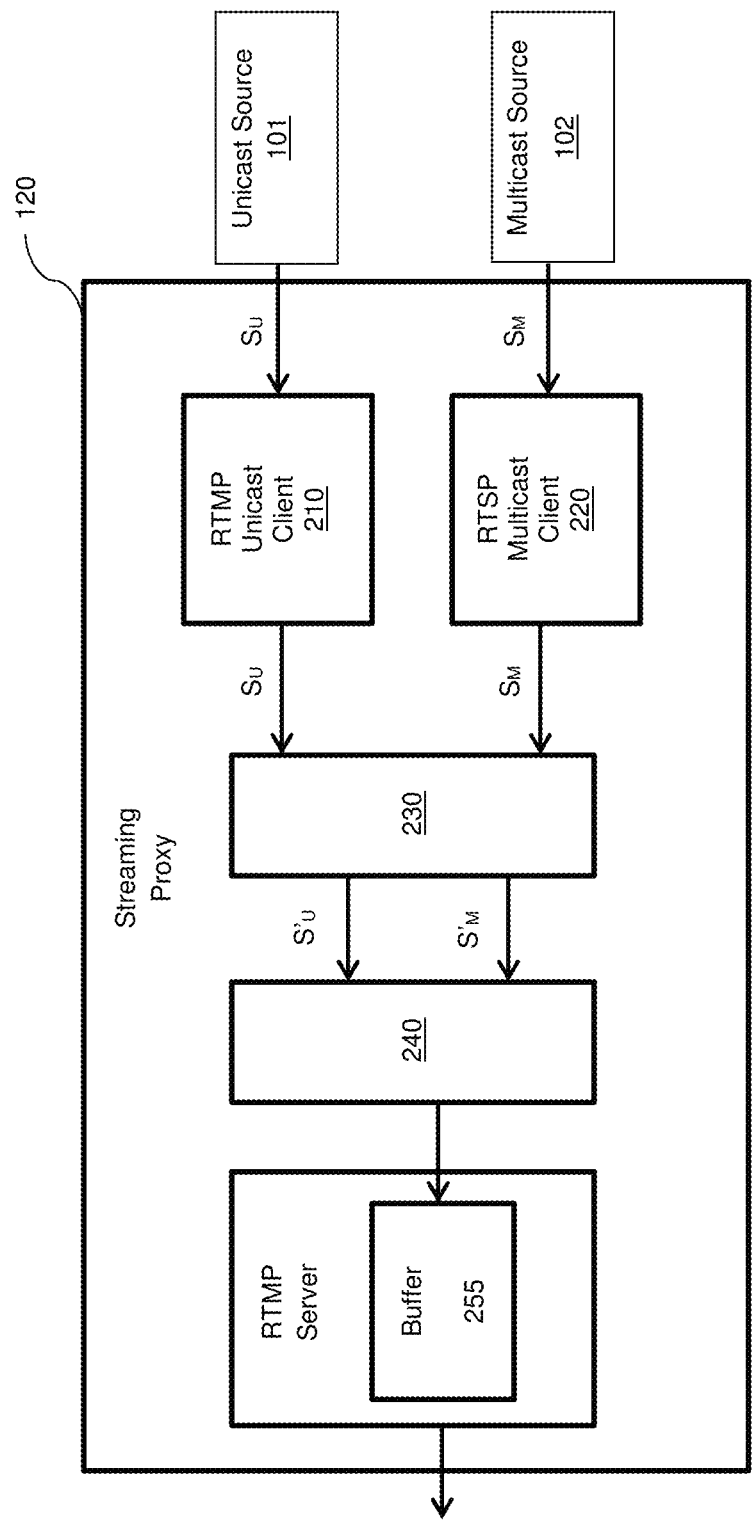
FIG. 2 is a schematic block diagram of a streaming proxy utilized for seamless switchover between unicast and multicast streaming sources for a RTMP streaming protocol according to an embodiment.

FIG. 2 illustrates a schematic block diagram of the streaming proxy 120 according to one embodiment. As a non-limiting example, the streaming proxy 120 described herein with respect to FIG. 2 provides content according to a real time messaging protocol (RTMP) streaming protocol.

In some exemplary embodiments, the streaming proxy 120 includes a RTMP unicast client 210 and a real time streaming protocol (RTSP) multicast client 220, a comparator module 230, a selector module 240, and a RTMP server 250. The RTMP unicast client 210 and the RTSP multicast client 220 are connected to unicast streaming source 110 and multicast streaming source 102, respectively, as discussed in greater detail below. RTMP unicast client 210, RTSP multicast client 220, and RTMP server 250 may be implemented as standard RTMP and RTSP elements.

Both the RTMP unicast client 210 and the RTSP multicast client 220 receive the content of an OTT stream. The OTT stream may be, but is not limited to, a live, linear, near real-time, replicated, or VoD stream. The RTMP unicast client 210 is configured to retrieve a unicast OTT stream ($S_U$) from the unicast streaming source 101, to de-capsulate the streaming protocol headers of the received stream, and to forward the unicast stream in its encoded format to the comparator module 230. Similarly, the RTSP multicast client 220 is configured to retrieve a multicast OTT stream ($S_M$) from the multicast streaming source 102, to de-capsulate the streaming protocol headers of the multicast stream, and to forward the stream content in its encoded format to the comparator module 230. The streams' contents retrieved by both the RTMP unicast client 210 and the RTSP multicast client 220 include compressed video/audio data without any control information.

It should be noted that, since OTT unicast stream $S_U$ and OTT multicast stream $S_M$ are received from different resources, their timing is not synchronized and, as such, switching from one source to the other without synchronizing the streams would result in a gap of displayed content, thereby leading to QoE degradation.

The comparator module 230 is configured to receive the OTT unicast stream $S_U$ and OTT multicast stream $S_M$ of the same content in their encoded formats. In one embodiment, the comparator module 230 determines the time delay between the two received streams by comparing the timestamps of the video frames within the streams.

In one embodiment, the comparator module 230 is configured to compare I/B/P frame sequences generated respective of the unicast and multicast streams to determine the time delay. It should be appreciated that an I/B/P frame sequence provides a unique representation of the content at any point in the time during which the content is being played. The comparator module 230 is configured to compare I/B/P frame sequences having similar but time-shifted contents to compute the time delay. In such an embodiment, RTMP unicast client 210 and RTSP multicast client 220 may receive or extract the I/B/P frame sequences respective of the unicast and multicast streams. In a further embodiment, the I/B/P frame sequences may be retrieved or extracted from, e.g., the unicast source 101 and the multicast source 102.

Figure 3:
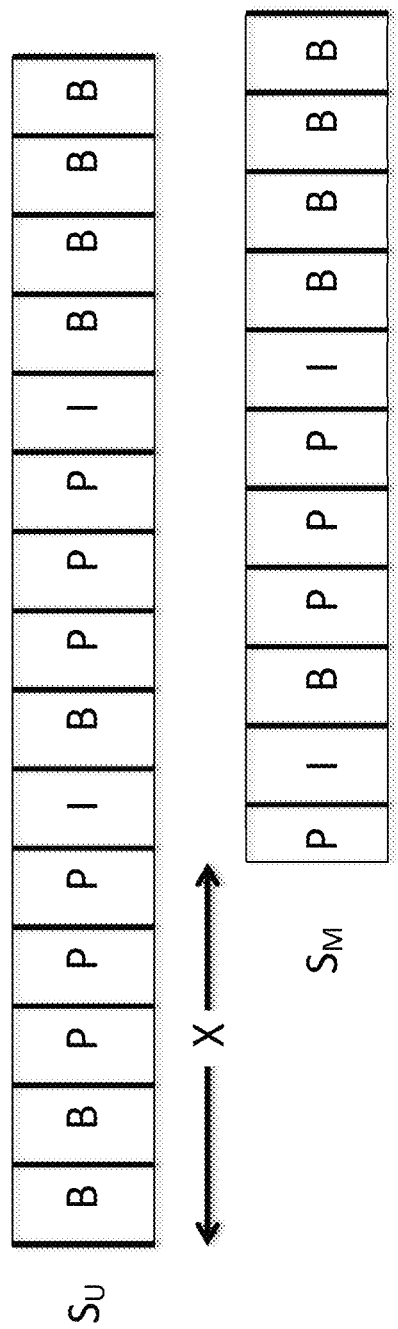
FIG. 3 illustrates I/B/P frame sequences utilized for detection of a live OTT stream.

For example, FIG. 3 illustrates exemplary and non-limiting I/B/P frame sequences for the streams $S_U$ and $S_M$. In this example, the order of each of the I/B/P frame sequences respective of the streams $S_U$ and $S_M$ is identical such that the sizes of the I/B/P frame sequences are identical. The time delay 'X' is the difference in start times between the respective unicast and multicast OTT streams $S_U$ and $S_M$.

Based on the time delay 'X' determination, the comparator module 230 utilizes a delay buffer mechanism (not shown) to synchronize the two streams. For example, a duration of X seconds may be provided to the stream $S_U$ as a buffer to match its timing to that of the multicast stream $S_M$. The output of the comparator module 230 is synchronized unicast and multicast streams $S'_U$ and $S'_M$, respectively. Operation of comparator modules is described further herein below with respect to FIG. 6.

The selector module 240 is configured to receive the synchronized streams $S'_U$ and $S'_M$ and to select which stream to feed to the RTMP server 250. This selection may be based on an external control or an internal control. An external control may include, but is not limited to, a user selection of which stream to use. An Internal control may be generated, for example, by a selection process implemented in the selector module 240. The selection process may dictate the type of stream to select based on, for example, a default preconfigured selection, the source of the OTT stream, a type of the user edge terminal, a type of the media player, or any combination thereof. As a non-limiting example of a default preconfigured selection, such a selection may dictate that multicast streams are always selected over unicast streams when possible.

If a decision is made to switch to a new source, the selector module 240 is configured to switch to the selected source by, i.e., routing OTT streams (that may or may not be buffered) from the selected source to the RTMP server 250. Once the switchover has concluded, the selector module 240 is further configured to direct the client associated with the selected OTT stream (multicast or unicast) that was not selected to disconnect its session. Such disconnection avoids double bandwidth consumption related to retrieving two streams of the same content. The selected stream is utilized to fill input buffer 255 of the server 250, which is typically responsible for streaming content to a player such as, e.g., media player 110 as described in FIG. 1.

Figure 4:
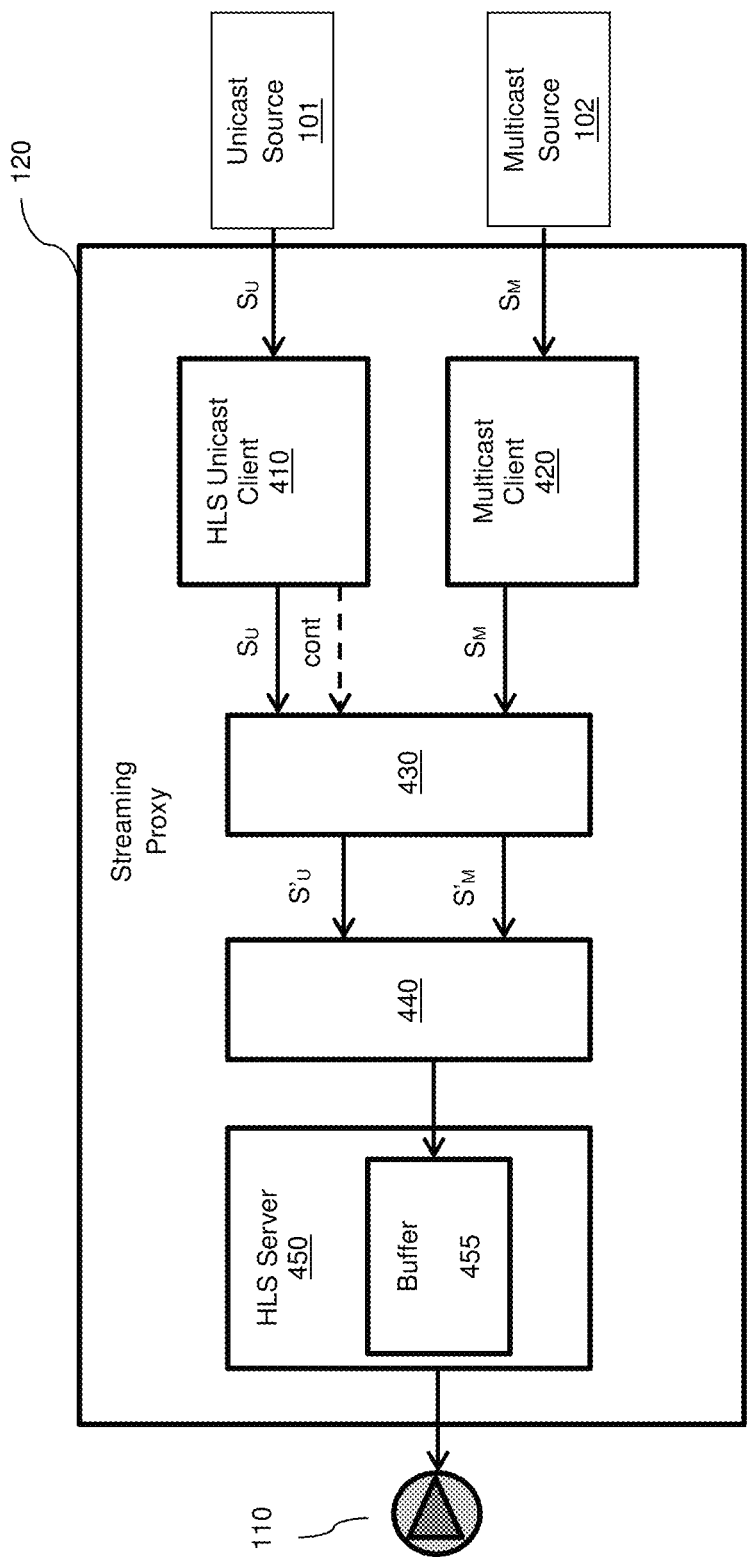
FIG. 4 is a schematic block diagram of a streaming proxy utilized for seamless switchover between unicast and multicast streaming sources for a HLS streaming protocol according to an embodiment.

FIG. 4 illustrates a schematic block diagram of the streaming proxy 120 according to another embodiment. As a non-limiting example, the streaming proxy 120 described herein with respect to FIG. 4 provides content according to a HTTP live streaming (HLS) protocol.

In some exemplary embodiments, the streaming proxy 120 includes a HLS unicast client 410 and a multicast client 420, a comparator module 430, a selector module 440, and a HLS server 450. The multicast client 420 may be implemented as standard a HTTP over UDP client. The HLS unicast client 410 and HLS server 250 may be implemented standard HLS elements. The unicast and multicast clients 410 and 420 are respectively connected to the unicast and multicast streaming sources 101 and 102 as discussed in greater detail below.

Both the HLS unicast client 410 and the multicast client 420 receive the content of an OTT stream. The OTT stream may be a live, linear, near real-time, replicated, or VoD stream. The HLS unicast client 410 is configured to retrieve a unicast OTT stream $S_U$, to de-capsulate the streaming protocol headers of the stream, and to forward the unicast stream in its encoded format to the comparator module 430. Similarly, the multicast client 420 is configured to retrieve a multicast OTT stream, to de-capsulate the streaming protocol headers of the stream, and to forward the stream in its encoded format to comparator module 430. In an embodiment, the unicast stream $S_U$ may be retrieved by, but not limited to, an OTT content provider or content delivery network. The streams' contents retrieved by both the unicast and multicast clients may include video/audio data. The unicast streams' contents also include control information. The control information typically includes at least a playlist that lists any data chucks such as, e.g., MPEG transport stream (TS) segments retrieved from or requested by each of the client 410.

Also in this case, unicast and multicast OTT streams $S_U$ and $S_M$ are received from different resources so that their timing is not synchronized and, as such, switching from one source to the other without synchronizing the streams would result in a gap of displayed content, thereby leading to QoE degradation.

The comparator module 430 is configured to determine the synchronization gap between retrieved unicast and multicast OTT streams $S_U$ and $S_M$. To this end, the comparator module 430 is configured to receive the unicast and multicast streams ($S_U$ and $S_M$) of the same content in their encoded formats and to determine the time delay between the two streams.

In one embodiment, the time delay is determined by comparing a playlist of the unicast stream, and specifically the next TS segment designated in the playlist, to an actual TS segment index of a stream provided by the multicast source 102. Then, the comparator module 430 computes the difference between the TS segments in the respective segment indexes. For example, if the playlist of the unicast stream lists $TS_4$ as the next TS segment to request and the last TS segment delivered by the multicast stream is $TS_2$, then there is a difference of two TS segments between the two streams $S_U$ and $S_M$.

The selector module 440 is configured to select which stream to feed to the HLS server 450. This selection may be based on an external control or an internal control. An external control may include, but is not limited to, a user selection of which stream to use. As noted above, an internal control may be generated, for example, by a selection process implemented in the selector module 440. The selection process may dictate the type of stream to select based on, for example, a default preconfigured selection, the source of the OTT stream, a type of the user edge terminal, a type of the media player, or any combination thereof.

If a decision is made to switch to the multicast source, the selector module 440 is configured to compensate for the TS segments difference (computed by the comparator module 430) by modifying the unicast playlist to present only the segments up to current TS segment included in the multicast stream $S_M$ (e.g., $TS_2$ inclusive in the above example). This action synchronizes the multicast and unicast streams as presented to the media player 110. In an embodiment, the synchronization between the multicast and unicast streams will take place when a buffer size of the media player is bigger than the computed TS difference. Once the switchover to a multicast resource has concluded, the selector module 440 does not direct requests for additional TS segments to the HLS unicast client 410. This avoids double bandwidth consumption related to retrieving two streams of the same content. The selected stream is utilized to fill input buffer 455 of the HLS server 450, which is typically responsible for streaming content to the OTT player, (e.g., player 110, FIG. 1).

It should be noted that the embodiments discussed above with respect to FIGS. 2 and 4 are related to the operation of RTMP and HLS protocols, respectively. However, one of ordinary skill can adapt the disclosed embodiments to other types of streaming protocols. As non-limiting examples, the disclosed embodiments can be utilized in streaming protocols including, but not limited to, real time streaming protocol (RTSP), HTTP dynamic streaming, moving picture experts group (MPEG)-dynamic adaptive streaming over HTTP (DASH), and the like.

The streaming proxy 120 and/or each of its modules may be realized by one or more processing systems. Such a processing system may comprise or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

Figure 5:
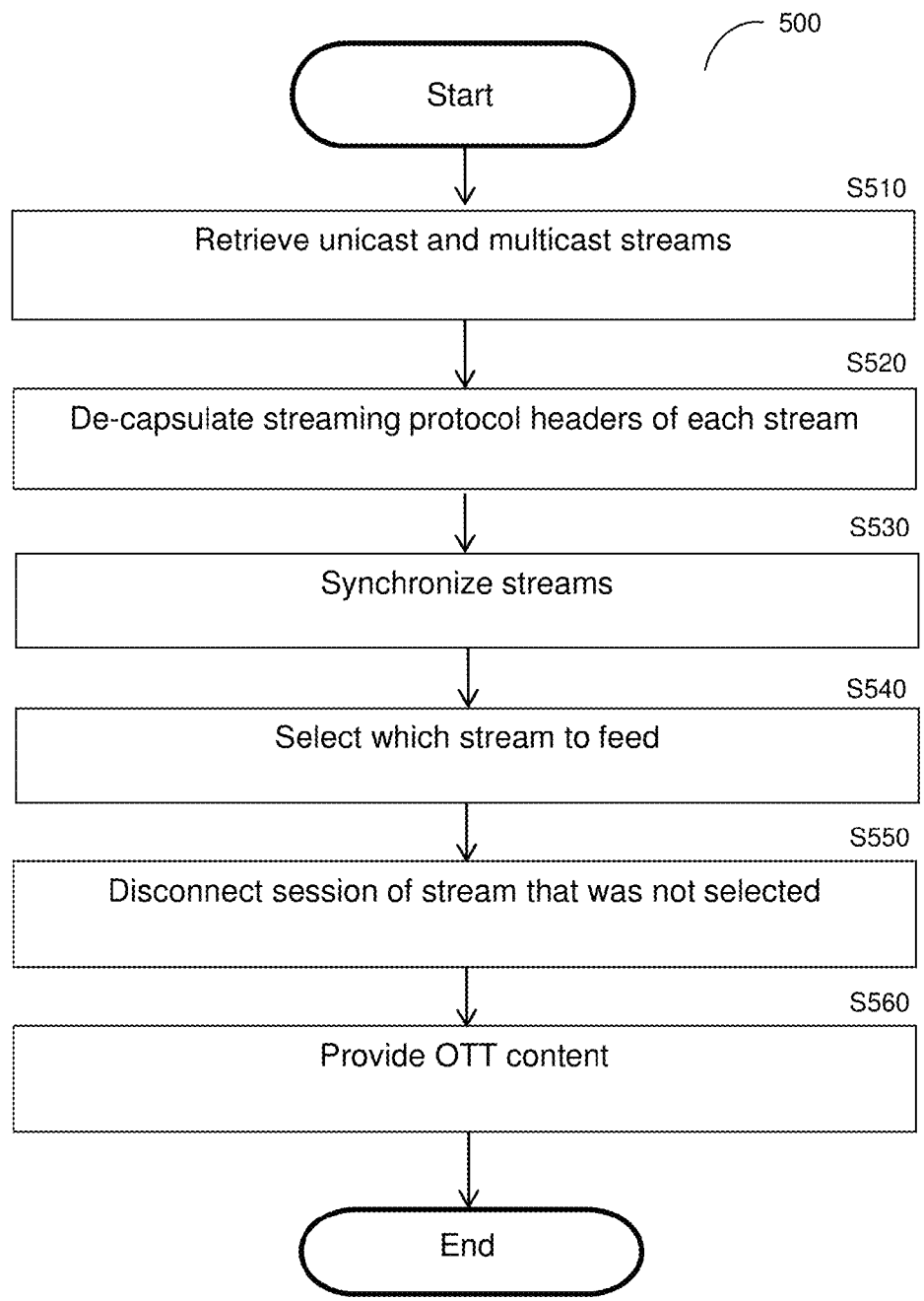
FIG. 5 is a flowchart illustrating a method for seamless switchover between unicast and multicast streams according to an embodiment.

FIG. 5 is an exemplary and non-limiting flowchart 500 of a method for seamless switching between unicast and multicast streams on a user edge terminal according to an embodiment. In an embodiment, the method disclosed herein may be performed by, but not limited to, a proxy (e.g., the streaming proxy 120).

In S510, unicast and multicast OTT streams are respectively retrieved from a unicast source and a multicast source (e.g., sources 101 and 102 defined above). In an embodiment, the retrieved streams are live OTT streams. In S520, the streaming protocol headers of each stream are de-capsulated. Such de-capsulation allows the headers to be delivered to the appropriate application. In S530, the unicast and multicast streams are synchronized. In an embodiment, based on the time delay between the streams, a buffer mechanism may be used to synchronize the times of such streams. Synchronization of streams is described further herein below with respect to FIG. 6.

In S540, the stream which will be fed to the user is selected. Such selection may be based on an external control or an internal control. Examples of such controls are provided herein above with respect to FIG. 2. In S550, respective of the selection, the session of the stream which was not selected to be fed to the user is disconnected. Such disconnection minimizes extraneous bandwidth consumption by avoiding the issue of double bandwidth consumption as a result of duplicate streams.

In S560, the OTT content in the selected OTT stream is provided. In an embodiment, such content may be provided to a media player (e.g., media player 110).

In an embodiment where the method is implemented on a particular user terminal (e.g., user edge terminal 100), such requests are received whenever the user edge terminal requests OTT content streaming. In another embodiment, such requests may be received when, e.g., any user terminal in a communication network requests OTT content streaming, any terminal in a communication network ceases OTT content streaming, and so on.

Figure 6:
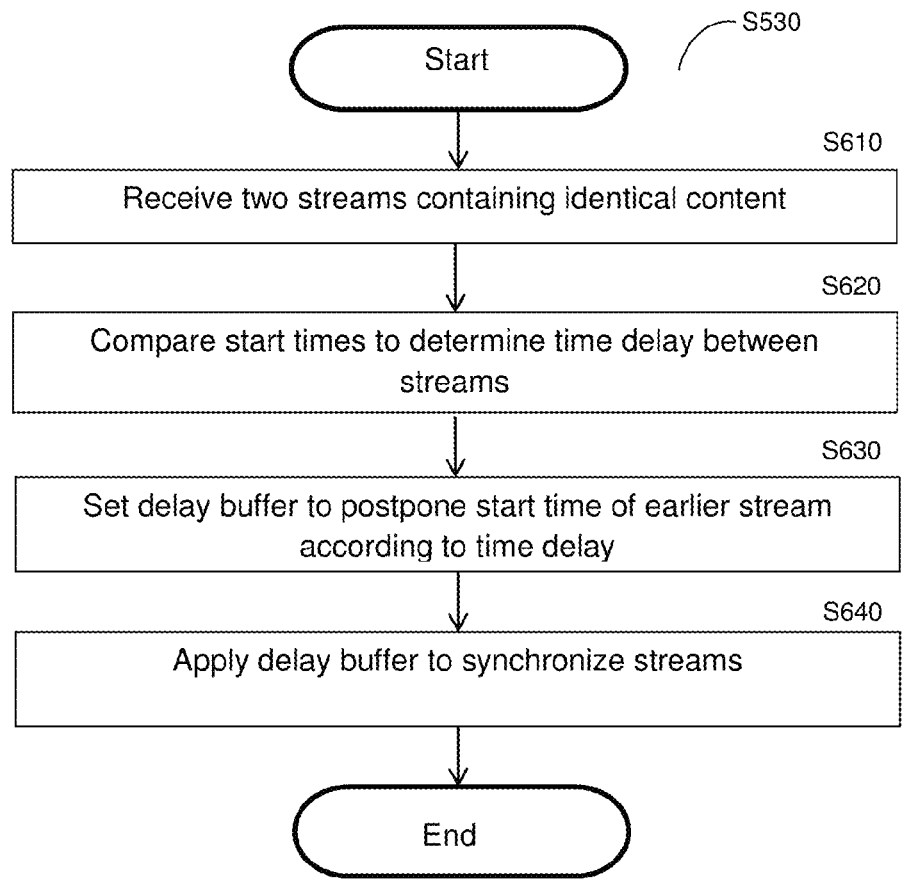
FIG. 6 is a flowchart illustrating operation of a comparator module according to an embodiment.

FIG. 6 is an exemplary and non-limiting flowchart S530 illustrating synchronization of multicast and unicast streams according to an embodiment. In an embodiment, synchronization of streams may be performed by a comparator module (e.g., comparator module 230, comparator module 430, and so on).

At S610, at least an OTT unicast stream and an OTT multicast stream are received. The streams are related to the same content (e.g., a video clip, an audio clip, etc.)

At S620, the time difference (delay) between the received streams is determined. If the streams have different start times, such difference may be noted. In an embodiment, the stream with the earlier start time may also be determined.

At S630, based on the determination of earlier stream and time delay between streams, a delay mechanism is set such that the buffer will postpone the start time of the earlier stream by the amount of the time delay. In S640, the delay buffer is applied, thereby synchronizing the streams.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

Also, it should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

Although some benefits and advantages of the preferred embodiments are mentioned, the scope of the disclosure is not intended to be limited to particular benefits, uses, or objectives. Rather, embodiments of the disclosure are intended to be broadly applicable to different wireless technologies, system configurations, networks, and transmission protocols, some of which are illustrated by way of example in the figures and in the description.

All examples and conditional language recited herein are intended for pedagogical purposes to aid the reader in understanding the disclosed embodiments and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for switching between a unicast streaming source and a multicast streaming source of over-the-top (OTT) streams, comprising:
    retrieving an OTT unicast stream from the unicast streaming source and an OTT multicast stream from the multicast streaming source, wherein there is a time delay between the OTT unicast stream and the OTT multicast stream;
    synchronizing the OTT unicast stream and the OTT multicast stream to compensate for the time delay by comparing the OTT unicast stream and the OTT multicast stream, wherein comparing the OTT unicast stream and the OTT multicast stream includes comparing an index of a next requested TS segment designated in a playlist of the OTT unicast stream to an index of a current TS segment included in the OTT multicast stream; and
    determining a time delay based on a difference between the TS segment indexes;
    selecting one of the OTT unicast stream and the OTT multicast stream; and
    switching to a streaming source of the selected OTT stream.

2. The method of claim 1, further comprising:
    feeding a media player from the streaming source of the selected OTT stream; and
    disconnecting a session with a streaming source feeding the OTT stream which was not selected.

3. The method of claim 1, wherein comparing the OTT unicast stream and the OTT multicast stream further comprises:
    receiving an I/B/P frame sequence respective of each of the OTT unicast stream and the OTT multicast stream;
    comparing the received I/B/P frame sequences of the OTT unicast stream and the OTT multicast stream; and
    determining the time delay based on the comparison.

4. The method of claim 1, wherein synchronization of the OTT unicast stream and the OTT multicast stream is based on one or more protocols utilized to stream the OTT unicast stream and the OTT multicast stream.

5. The method of claim 4, wherein the protocol is any one of: a real time messaging protocol (RTMP), a HTTP live streaming (HLS) protocol, a real time streaming protocol (RTSP), HTTP dynamic streaming, and moving pictures experts group (MPEG)-dynamic adaptive streaming over HTTP (DASH).

6. A communication terminal, comprising:
    a processing unit; and a memory, the memory containing instructions that, when executed by the processing unit, configure the terminal to:
retrieve an OTT unicast stream from the unicast streaming source and an OTT multicast stream from the multicast streaming source, wherein there is a time delay between the OTT unicast stream and the OTT multicast stream;
compare the OTT unicast stream and the OTT multicast stream to synchronize the OTT unicast stream and the OTT multicast stream to compensate for the time delay;
select one of the synchronized OTT unicast stream and the OTT multicast stream; and
switch to a streaming source of the selected OTT stream, wherein the terminal is configured to compare the OTT unicast stream and the OTT multicast stream to by comparing an index of a next requested TS segment designated in a playlist of the OTT unicast stream to an index of a current TS segment included the OTT multicast stream and determining a time delay based on a difference between TS segment indexes.

7. The communication terminal of claim 6, further configured to:
feed a media player from the streaming source of the selected OTT stream; and
disconnect a session with a streaming source feeding the OTT stream which was not selected.

8. The communication terminal of claim 6, wherein the terminal is further configured to:
receive an I/B/P frame sequence respective of each of the OTT unicast stream and the OTT multicast stream;
compare the received I/B/P frame sequences of the OTT unicast stream and the OTT multicast stream; and
determine a time delay based on the comparison.

9. The communication terminal of claim 6, wherein synchronization of the OTT unicast stream and the OTT multicast stream is based on one or more protocols utilized to stream the OTT unicast stream and the OTT multicast stream.

10. The communication terminal of claim 9, wherein the protocol is any one of: a real time messaging protocol (RTMP), a HTTP live streaming (HLS) protocol, a real time streaming protocol (RTSP), HTTP dynamic streaming, and moving pictures experts group (MPEG)-dynamic adaptive streaming over HTTP (DASH).

11. A communication terminal, comprising:
a user interface;
a processing unit; and
a memory, the memory containing instructions that, when executed by the processing unit, configure the terminal to:
retrieve an OTT unicast stream from the unicast streaming source and an OTT multicast stream from the multicast streaming source, wherein there is a time delay between the OTT unicast stream and the OTT multicast stream;
compare the OTT unicast stream and the OTT multicast stream to synchronize the OTT unicast stream and the OTT multicast stream to compensate for the time delay;
select one of the OTT unicast stream and the OTT multicast stream;
switch to a streaming source of the selected OTT stream; and
feed the selected OTT stream to the user interface, wherein the terminal is configured to compare the OTT unicast stream and the OTT multicast stream to by comparing an index of a next requested TS segment designated in a playlist of the OTT unicast stream to an index of a current TS segment included the OTT multicast stream and determining a time delay based on a difference between TS segment indexes.

12. The communication terminal of claim 11, wherein the terminal is further configured to:
disconnect a session with a streaming source feeding the OTT stream which was not selected.

13. The communication terminal of claim 11, wherein the terminal is further configured to:
receive an I/B/P frame sequence respective of each of the OTT unicast stream and the OTT multicast stream;
compare the received I/B/P frame sequences of the OTT unicast stream and the OTT multicast stream; and
determine a time delay based on the comparison.

14. The communication terminal of claim 11, wherein synchronization of the OTT unicast stream and the OTT multicast stream is based on one or more protocols utilized to stream the OTT unicast stream and the OTT multicast stream.

15. The communication terminal of claim 14, wherein the protocol is any one of: a real time messaging protocol (RTMP), a HTTP live streaming (HLS) protocol, a real time streaming protocol (RTSP), HTTP dynamic streaming, and moving pictures experts group (MPEG)-dynamic adaptive streaming over HTTP (DASH).

\* \* \* \* \*